United States Patent Office 3,449,309
Patented June 10, 1969

3,449,309
PROCESS FOR THE POLYMERIZATION
OF OLEFINS
Tsutomu Tanaka and Tadaichi Tokuzumi, Ohtake-shi, and Hiroshi Fujimura, Wagi-mura, Japan, assignors to Mitsui Petrochemical Industries, Ltd., Tokyo, Japan, a corporation of Japan
No Drawing. Filed Feb. 5, 1964, Ser. No. 342,775
Claims priority, application Japan, Feb. 15, 1963, 38/6,159, 38/6,160, 38/6,161; Feb. 26, 1963, 38/8,544, 38/8,545
Int. Cl. C08f 1/42
U.S. Cl. 260—88.2    8 Claims The present invention relates to a process for the polymerization of olefins, wherein new catalyst systems are used.

Throughout this specification, by the term "polymerization" we mean polymerization and copolymerization.

As a process for polymerizing olefins, is well known, for example, a process wherein a mixture of a compound of metal of Groups IV-A, V-A, VI-A or VIII of the Periodic Table with an organometallic compound of Groups II or III of the Periodic Table is used as catalyst under relatively mild temperature and pressure conditions. Generally speaking, however, according to this process, yield of polymer is low, and it is not always possible to obtain high reproducibility concerning the result of polymerization. For example, it has often been experienced that even when reactions are carried out under the same conditions, marked differences are caused in respect of such points as yield, molecular weight, particle sizes or shapes of particles, etc.

The main object of the present invention is to provide a process for the polymerization of olefins for improving such defects of the well known process by using new catalyst compositions having high activity and stability and for obtaining advantageously polyolefins having high stereoregularity and excellent physical properties at a high yield and with good reproducibility.

The 1st process according to the present invention is a basic process for polymerization of olefins and comprises at least one of ethylenically unsaturated hydrocarbons is contacted with a catalyst composition comprising (1) a hydrocarbon-insoluble reaction product, formed by the reaction of a compound of a transition metal selected from the group consisting of metals of Groups IV-A, V-A, VI-A and VIII of the Periodic Table and manganese with an organometallic compound of a metal selected from the group consisting of alkali metals, alkaline earth metals, zinc, cadmium, earth metals and the rare earth metals and (2) an organo-cadmium compound.

The process of the present invention is applicable to polymerization of any ethylenically unsaturated hydrocarbons such as those having vinyl, vinylidene or vinylene group or a mixture thereof. The present invention is important especially for the polymerization of mono-ethylenically unsaturated hydrocarbons wherein the unsaturated group is a vinylidene group, having the general formula

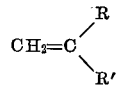

wherein R represents alkyl group and R' represents alkyl, cycloalkyl, aralkyl, aryl or alkaryl group of those wherein the unsaturated group is a vinyl group, having the general formula

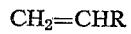

wherein R represents hydrogen, a linear or branched alkyl, cycloalkyl, aryl, aralkyl or alkaryl group or polyethylenically unsaturated hydrocarbons such as conjugated diolefins.

The compound of transition metal used in the first catalyst component may be a compound of any metal of Groups IV-A, V-A, VI-A or VIII of the Periodic Table, i.e., titanium, zirconium, hafnium, thorium, vanadium, columbium, tantalum, chromium, molybdenum, tungsten, uranium, iron, cobalt, nickel, etc., or manganese. The transition metal compound may be an inorganic salt such as a halide, oxyhalide, etc. or an organic salt or complex such as an acetylacetonate, etc. Typical examples of the transition metal compounds are titanium tetrachloride, zirconium tetrachloride, manganous chloride, nickelous chloride, zirconium acetylacetonate, vanadium oxyacetylacetonate, chromium acetylacetonate, etc.

The organometallic compound which is reacted with the said transition metal compound in the first catalyst component may be any organic compound of an alkali metal, alkaline earth metal, zinc, cadmium, earth metal or rare earth metal, as for example, diethylmagnesium, diethylzinc, diethylcadmium, butylmagnesium chloride, triethylaluminum, diethylaluminum chloride, ethylaluminum dichloride, aluminum sesquichloride.

The organo-cadmium compound used as the second catalyst component in the present invention may be dimethylcadmium, diethylcadmium, etc.

In the preparation of the first catalyst component, the molar ratio of the organo-cadmium compound to the transition metal compound may be varied over a wide range and a ratio of 0.2–08:1 may preferably be used. The reaction temperature may also be varied over a wide range, the most preferred range is 30 to 50° C. The obtained hydrocarbon-insoluble reaction product may be separated from other reaction mixture by decantation, filtration, etc., and is fully washed by liquid saturated hydrocarbon. Said product is used as the first catalyst component of the present invention in the form of suspension in liquid saturated hydrocarbon.

The quantity of the first catalyst component used in the polymerization reaction according to the present invention is 2 to 100 millimoles, preferably 5 to 80 millimoles and the quantity of the second catalyst component used in the polymerization reaction is 2 to 100 millimoles, preferably 5 to 30 millimoles per liter of inert organic solvent which is generally used in polymerization reaction as a reaction medium.

Further, we have discovered that in the aforesaid process of the present invention, the yield of polyolefins has been markedly improved without letting the stereoregularity of polyolefins decline, by adding an organopolybasic acid ester, polyhydric alcohol ester or polysiloxane, and that at the same time it is always possible to obtain better reproducibility with respect to the result of polymerization.

Therefore, the second process according to the present invention is a process for polymerization of olefins wherein at least one of ethylenically unsaturated hydrocarbons is contacted with a catalyst composition comprising (1) the hydrocarbon-insoluble reaction product formed by the reaction of a compound of a transition metal selected from the group consisting of metals of Groups IV-A, V-A, VI-A and VIII of the Periodic Table and manganese with an organo-metallic compound of a metal selected from the group consisting of alkali metals, alkaline earth metals, zinc, cadmium, earth metals and the rare earth metals (2) an organo-cadmium compound and (3) a a substance selected from the group consisting of organopolybasic acid esters, esters of carboxylic acid with polyhydric alcohol and polysiloxanes.

The examples of organo-polybasic acid esters are esters of aliphatic alcohol such as methyl, butyl, hexyl, octyl and higher alcohol with aliphatic dibasic acid such as succinic acid and adipic acid or with aromatic dibasic acid such as phthalic acid, or esters of aromatic alcohol such as benzyl alcohol and phenylethyl alcohol with the aliphatic or aromatic dibasic acid mentioned above. In particular, dibutyl phthalate, dioctyl phthalate and higher alkyl phthalates are very effective to obtain a high yield. The preferred polyhydric alcohol esters with carboxylic acid may be fatty acid esters of the aliphatic polyhydric alcohol such as ethyleneglycol, glycerine, diethyleneglycol, etc., and particularly higher fatty acid glycerides i.e. or vegetable fats and oils are preferred.

As the polysiloxanes, may be used any linear or cyclic polysiloxane having the formula:

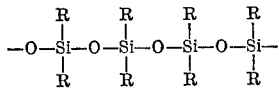

wherein R represents alkyl group, e.g. methyl group or aryl group, e.g., phenyl group and having such wide viscosity range as from several centistokes to 1,000,000 centistokes.

The quantities of the said esters or siloxanes to be used as the third catalyst component in the present invention may be varied within the moderately wide range and preferably from 0.001 to 0.5% by weight per 1 liter of the inert solvent used. But, larger quantities of the said component may be used without preventing the reacion, if desired.

It is preferable to prepare the aforesaid three components, which constitute the catalyst composition to be used in the present invention, immediately before commencement of polymerization reaction. Suitably, this preparation is carried out by adding the first catalyst component to an inert solvent to form a suspension and adding the second and third catalyst component to said suspension.

Further, we have discovered that it is possible to optically adjust the molecular weight of the olefins according to the aforesaid second process without producing any undesirable effect on the yield and stereoregularity of polyolefins by adding a suitable quantity of hydrogen during the polymerization reaction.

Therefore, the third process according to the present invention is an improved process for manufacturing polyolefins having any desired molecular weight and uniform particle size with a high yield and a good reproducibility.

The quantity of hydrogen to be added can change over a wide range depending upon to what extent the molecular weight of polymer can be lowered as compared with the case where hydrogen is not added, and depending upon catalyst, monomer, temperature, pressure, etc. employed. Generally speaking, the quantity of hydrogen to be added is 0.001–99 mol. percent, especially 0.01–20 mol percent, of monomer of monomers fed into the polymerization system. Said quantity of hydrogen may be added at a time at the commencing of polymerization or at a certain stage during polymerization or in several times, splitting the amount, or continuously during polymerization. The hydrogen may be added to a reaction mixture after it has been mixed with inert gas such as nitrogen or with gaseous monomer, or may be held over the reaction mixture as a blanket.

The aforesaid processes for polymerization of olefins according to the present invention can be carried out in various ways, for example, by batch system or continuous system, using or not using a reaction medium. As reaction medium, may be used inert organic diluents, for example, aliphatic hydrocarbons such as hexane, heptane; cyclic hydrocarbons such as cyclohexane; aromatic hydrocarbons such as benzene, toluene, xylene; hologenated aromatic hydrocarbons such as chlorobenzene, chloronaphthalene.

The temperature and pressure to be employed in the polymerization process of the present invention may be varied depending on the kind of monomer or activity of the catalyst system. In general, the polymerization can desirably be carried out at room temperature or at somewhat higher temperature and under atmospheric pressure or under somewhat higher pressure, but if desired, a temperature range which can be between −50° C. and 150° C. and a pressure between almost vacuum and 50 atmospheric pressures may be used.

The present invention is further illustrated in the following examples.

EXAMPLE 1

Preparation of hydrocarbon insoluble catalyst component

Under nitrogen atmosphere, 386 millimoles of diethylaluminium monochloride was dissolved in 1 liter of completely dehydrated and purified kerosene, and 594 millimoles of titanium tetrachloride was added dropwise thereto during about 30 minutes, while the mixture being stirred strongly, at a temperature below room temperature, and thereafter the temperature was raised to 40° C., and reaction was further carried out for 3 hours, with stirring of the solution. The insoluble precipitate was separated by decantation and was used as suspension after washing the precipitate several times with saturated hydrocarbons. In this case, a precipitate containing titanium trichloride was produced, and its concentration could be quantified by titration.

Preparation of catalyst and polymerization of olefin

Under nitrogen atmosphere and at room temperature, 250 cc. of kerosene was charged into another glass vessel with an agitator and 4 millimoles of the hydrocarbon-insoluble catalyst component obtained by the above preparation was added thereto. 2.5 millimoles of diethylcadmium was added to the reactor and the temperature was raised to 70° C., and then ethylene was introduced therein. Thus, the polymerization reaction has occurred. After 3 hours 91 g. of polyethylene having uniform particle size was obtained. The apparent density and molecular weight thereof was 0.297 and 700,000, respectively.

EXAMPLE 2

Under nitrogen atmosphere and at room temperature, 750 cc. of n-heptane was charged into an autoclave with an agitator, and 12 millimoles of the same hydrocarbon-insoluble catalyst component as used in Example 1, was added thereto, and then the temperature was raised to 70° C. after adding 12 millimoles of diethylcadmium. The polymerization reaction was commenced immediately by introducing a mixed gas of ethylene and propylene containing 7% of propylene at the rate of 60 l./hr. into the autoclave. As polymerization progressed the internal pressure of the reactor was heightened gradually, and reaction was stopped when the pressure reached to 5 atmospheric pressure gauge, and, as a result, 272 g. of copolymer of ethylene and propylene was obtained. This copolymer contained about 5% propylene, and molecular weight thereof was about 130,000.

EXAMPLE 3

Under nitrogen atmosphere, 250 cc. of kerosene and 0.1 cc. of dimethylpolysiloxane having the viscosity of 200 centistokes were charged into a glass polymerization vessel with an agitator, and 4 millimoles of the same hydrocarbon-insoluble catalyst component as used in Example 1, was added thereto. Then the temperature was raised to 70° C. after adding 2.5 millimoles of diethylcadmium and then nitrogen was replaced by ethylene. The polymerization reaction took place immediately by introducing ethylene and even after 3 hours activity of the ctaalyst could still be recognized, but at that time the reaction was stopped and solid products were filtrated and dried. As a result, polyethylene whose yield, apparent density and molecular weight were 136 g., 0.355 and 720,000 respectively, was obtained. As is clear from comparison with Example 1, in which polysiloxane was not added, the polymerization rate in case polysiloxane was used was higher than the rate in case polysiloxane was not used.

EXAMPLE 4

Under nitrogen atmosphere, 750 cc. of n-heptane and 0.3 cc. of rapeseed oil were charged into a polymerization reactor with an agitator, and 22.5 millimoles of the same hydrocarbon-insoluble catalyst component as used in Example 1, was added thereto. Then the temperature was raised to 70° C. after adding 22.5 millimoles of diethylcadmium. The polymerization reaction took place immediately by introducing propylene at the rate of 60 l./hr., and the reaction was continued until the internal pressure was reached to 6 atmospheric pressures gauge. As a result, 308 g. of polypropylene whose apparent density was 0.335, was obtained. 91% of the polypropylene was insoluble in boiling heptane, and the molecular weight of the polypropylene was 185,000.

For comparison, the above procedure was repeated except that rapeseed oil was not added, and, as the result, 231 g. of polypropylene, whose apparent density was 0.311, was obtained. 92% of the polypropylene was insoluble in boiling heptane, and the molecular weight of the polypropylene was 192,000. It is apparent that the rate could be increased by addition of rapeseed oil without affecting stereoregularity of polypropylene.

EXAMPLE 5

250 cc. n-heptane as saturated hydrocarbon and 0.15 cc. dioctyl phthalate were changed into a polymerization reactor with an agitator, and 10 millimoles of the same hydrocarbon-insoluble catalyst as used in Example 1, and 7.5 millimoles of diethylcadmium were added thereto. After temperature was raised to 60° C., butene-1 was introduced into the reactor for 3 hours, and, as a result, 60 g. of polybutene-1 was obtained. The molecular weight of the polymer was 45,000.

EXAMPLE 6

750 cc. of n-hexane, 0.15 g. of diphenyl polysiloxane having the viscosity of 100,000 centistokes, and 22.5 millimoles of the same hydrocarbon-insoluble catalyst component as used in Example 1 and 22.5 millimoles of diethylcadmium were charged together into an autoclave with an agitator, and then the temperature was raised to 70° C. A mixed gas containing propylene and ethylene containing 20% of propylene was introduced into the reactor at the rate of 30 l./hr., and copolymerization reaction was carried out until the internal pressure was heightened to 5 atmospheric pressures gauge. As the result, 130 g. of elastic ethylene-propylene copolymer containing about 15% of propylene unit and having the molecular weight of about 100,000, was obtained.

For comparison, the above procedure was repeated except that polysiloxane was not added. The heightening of internal pressure of the reactor was quick, and when the internal pressure was heightened to 5 atmospheric pressures gauge, the yield of copolymer was 99 g. It was found that when polysiloxane was added, the absorption rate was clearly higher than when polysiloxane was not added.

EXAMPLE 7

Under nitrogen atmosphere, 250 cc. of kerosene and 0.1 cc. dimethyl polysiloxane having the viscosity of 200 centistokes were charged into a polymerization vessel with an agitator, and 4 millimoles of the same hydrocarbon-insoluble catalyst component as used in Example 1, was added thereto. Then, 2.5 millimoles of diethylcadmium was added thereto and the temperature was raised to 70° C. and then ethylene containing 4% hydrogen was introduced to carry out the polymerization reaction. After 3 hours the reaction was stopped, and as the result, 141 g. of polyethylene having the apparent density of 0.351 and the average molecular weight of 120,000 was obtained.

As is clear from a comparison with Example 3 wherein hydrogen was not added, the molecular weight was decreased by addition of hydrogen, without any undesirable effect on the polymerization rate.

EXAMPLE 8

Under nitrogen atmosphere and at room temperature, 750 cc. of n-hexane was charged into each of autoclaves (A), (B) and (C), each having an agitator, and 0.45 cc. of dioctyl phthalate was added to each of (B) and (C). Then, after adding to each autoclave 22.5 millimoles of the same hydrocarbon-insoluble catalyst component as used in Example 1 and 27 millimoles of diethylcadmium, the temperature was raised to 60° C. Hydrogen was added to (A) and (C) until the internal pressure was reached to 0.5 atmospheric pressure gauge, and then ethylene was introduced into (A), (B) and (C) at the rate of 60 1./hr. and the polymerization reaction was immediately commenced. When the internal pressure of each reactor was reached to 5 atmospreric pressures gauge, methanol was added and reaction was stopped. In the case of (A) where hydrogen was added but the ester was not, the internal pressure of reactor rose quickly than in the cases of reactors (B) and (C), and the yield of polyethylene and the molecular weight thereof were 245 g. and 78,000, respectively.

In the case of (B) where the ester is added, but hydrogen is not, the yield and molecular weight of polyethylene were 309 g. and 910,000 respectively. In the case of (C) where both the ester and hydrogen were added, the yield and molecular weight of polyethylene were 302 g. and 73,000, respectively.

EXAMPLE 9

Under nitrogen atmosphere, 750 cc. of kerosene, 0.2 g. of glyceryl tristearate, 15 millimoles of the same hydrocarbon-insoluble catalyst component as used in Example 1, and 15 millimoles of diethylcadmium were charged into an autoclave with an agitator. After the temperature was raised to 70° C., hydrogen was added until the internal pressure was reached to 4 atmospheric pressures gauge, and then ethylene-propylene mixed gas containing 2% of propylene was introduced at the rate of 60 1./hr. and the polymerization reaction took place. When the internal pressure was reached to 5 atmospheric pressures gauge, the reaction was stopped. As the result, 260 g. of ethylene-propylene copolymer having the apparent density of 0.335 and molecular weight of 39,000 was obtained.

For comparison, the above procedure was repeated except that the glyceryl tristearate was not added. In this case, the internal pressure of reactor rose quickly. As the result of carrying out polymerization until the internal pressure was reached to 5 atmospheric pressure gauge, the yield of copolymer was 206 g. It was found that absorption rate in the case of adding ester was greater than in the case of adding no ester.

EXAMPLE 10

300 cc. of n-heptane, 0.10 cc. of rapeseed oil, 120 g. of styrene and 12 millimoles of the same hydrocarbon-insoluble catalyst component as used in Example 1 were charged into an autoclave with an agitator, and 36 millimoles of diethylcadmium and hydrogen were added thereto until the reactor's internal pressure was heightened to 0.4 atmospheric pressure gauge. The temperature was raised to 70° C., and as a result of carrying out stirring for 15 hours, the total polymerization product obtained was 72 g. The acetone-insoluble portion of the polymer was 70% and the remainder was oil and acetone-soluble solid material.

For comparison, the above procedure was repeated except that repaseed oil was not added, and, as the result, 58 g. of polymer was obtained, and 72% of the total polymer was insoluble in acetone. It was found that when rapeseed oil was added the polymerization rate was higher than the case where no rapeseed oil was added.

What we claim is:

1. A process for the polymerization of olefins wherein at least one ethylenically unsaturated hydrocarbon is contacted with at least a catalytic amount of a catalyst composition comprising (1) a hydrocarbon-insoluble reaction product formed by the reaction of titanium tetrachloride with an alkylaluminium compound, (2) an alkylcadmium compound and (3) a substance selected from the group consisting of dimethyl polysiloxane, diphenyl polysiloxane, dioctyl phthalate, rapeseed oil and glyceryl tristearate.

2. A process as claimed in claim 1 wherein the polymerization reaction is carried out in the presence of an inert solvent.

3. A process as claimed in claim 1 wherein the polymerization reaction is carried out in the presence of hydrogen.

4. A process as claimed in claim 1 wherein the alkylcadmium compound is diethylcadmium.

5. A process as claimed in claim 1 wherein the monoethylenically unsaturated hydrocarbon is ethylene.

6. A process as claimed in claim 1 wherein the monoethylenically unsaturated hydrocarbon is a mixture of ethylene and propylene.

7. A process as claimed in claim 1 wherein the monoethylenically unsaturated hydrocarbon is propylene.

8. A process as claimed in claim 1 wherein the alkylaluminium compound is diethylaluminum chloride.

References Cited

UNITED STATES PATENTS

| | | | |
|---|---|---|---|
| 3,281,375 | 10/1966 | Vandenberg | 260—93.7 |
| 3,058,972 | 10/1962 | Fourcade et al. | 260—94.9 |
| 3,146,224 | 8/1964 | Coover | 260—94.9 |

OTHER REFERENCES

Chem, Abs., p. 16,595 (a) (1959).

Sitting: Polyolefin Resin Process, 1961, p. 50.

JOSEPH L. SCHOFER, *Primary Examiner.*

L. EDELMAN, *Assistant Examiner.*

U.S. Cl. X.R.

252—429; 260—93.5, 93.7 94.9